Patented July 29, 1930

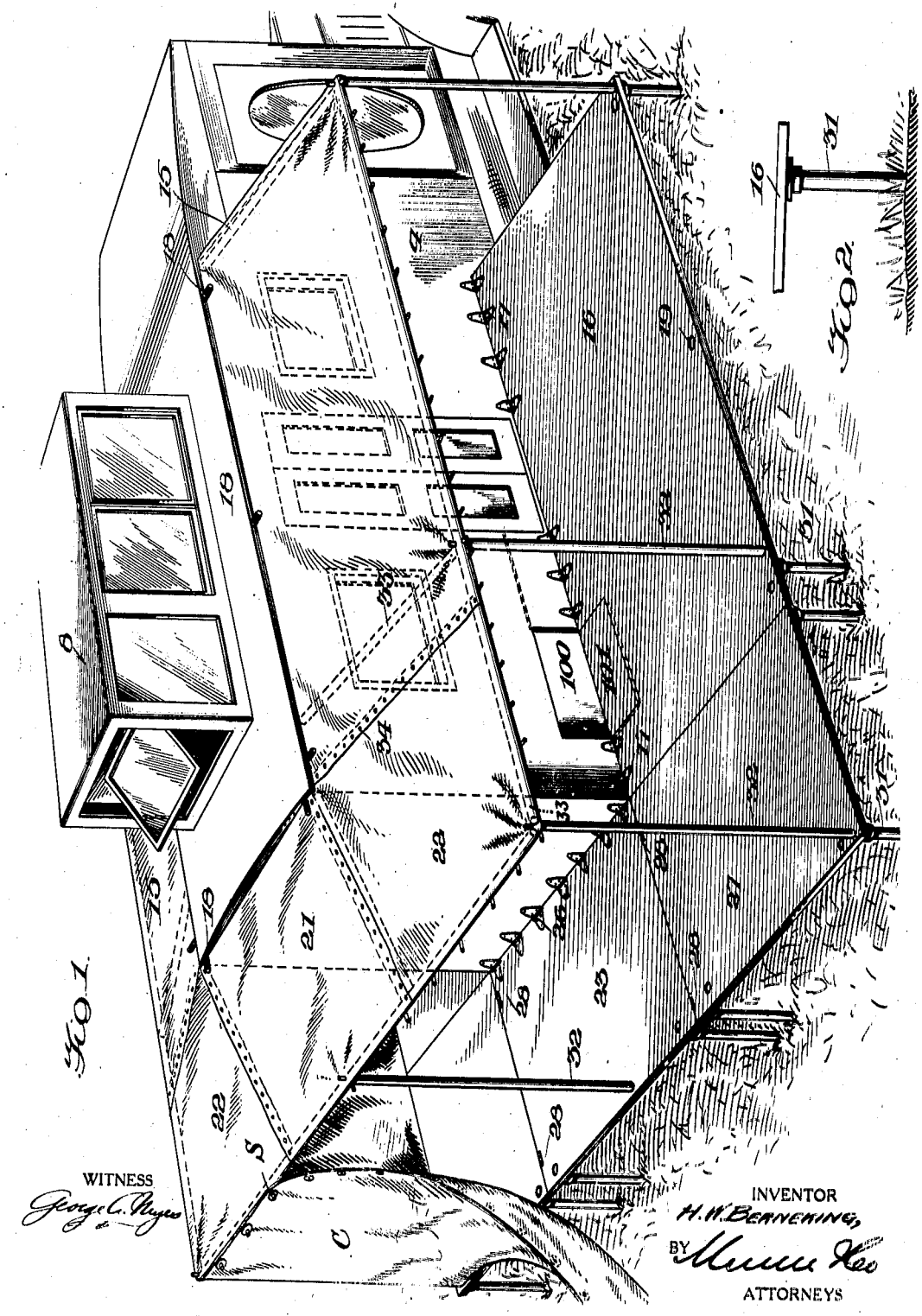

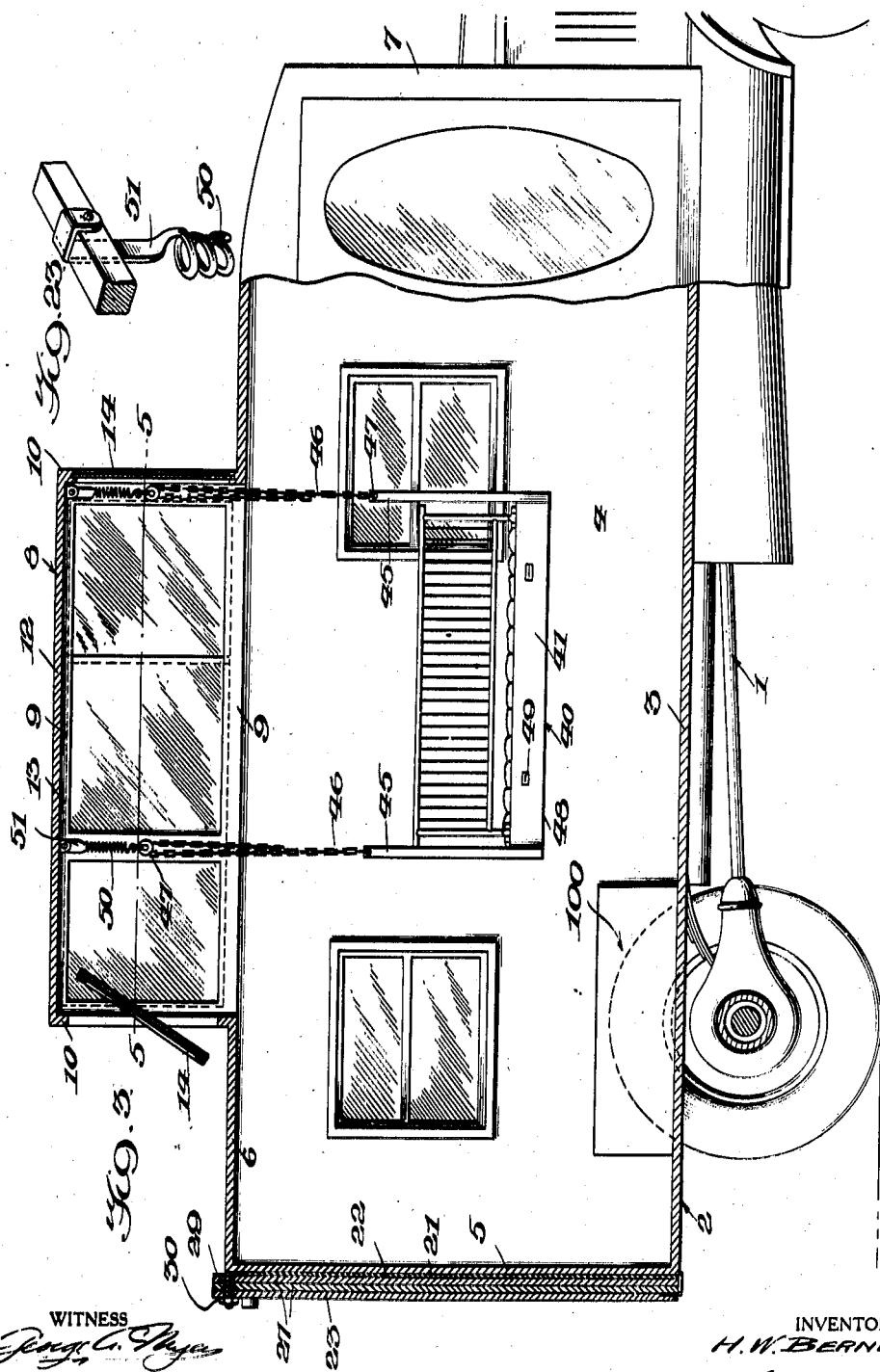

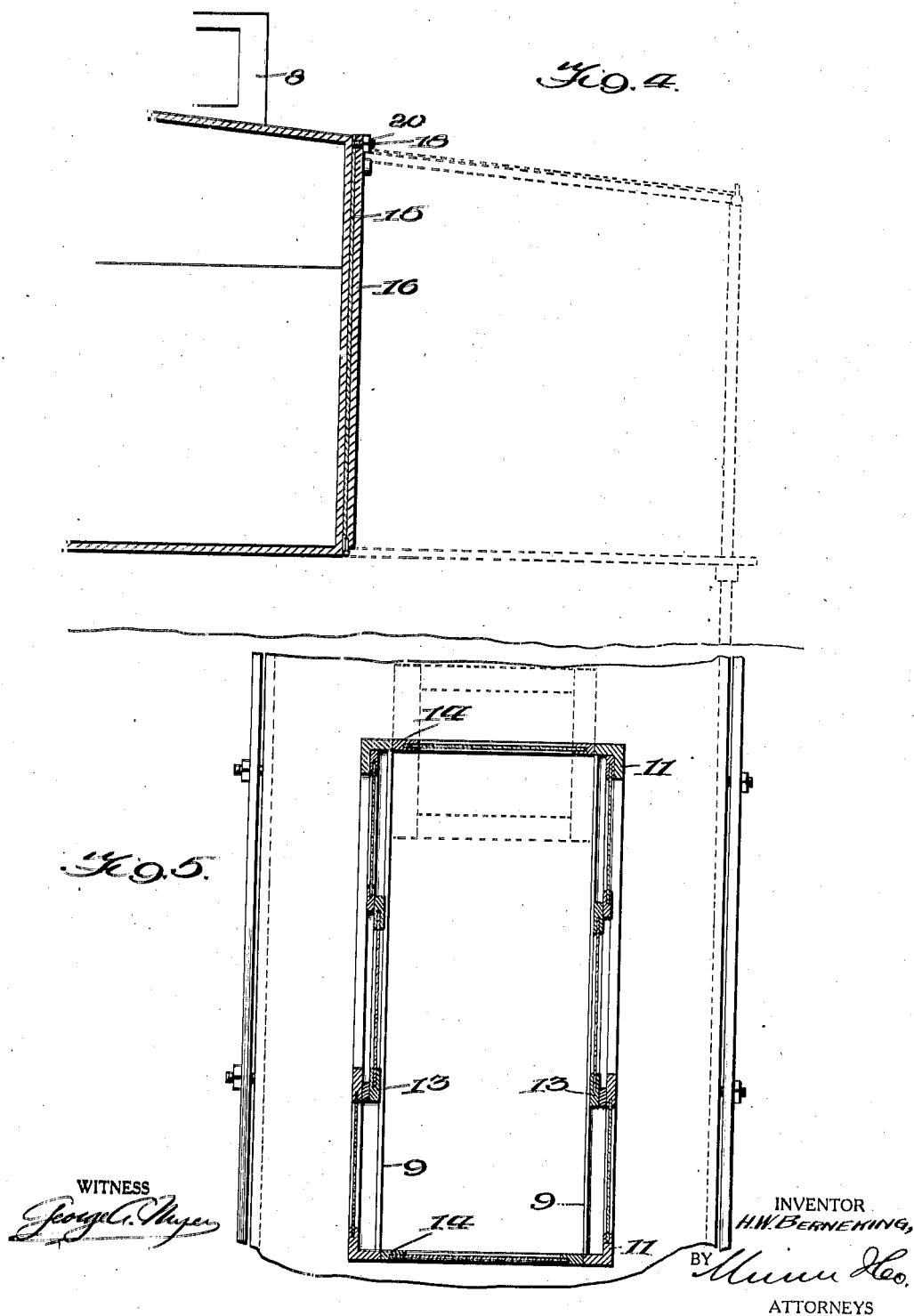

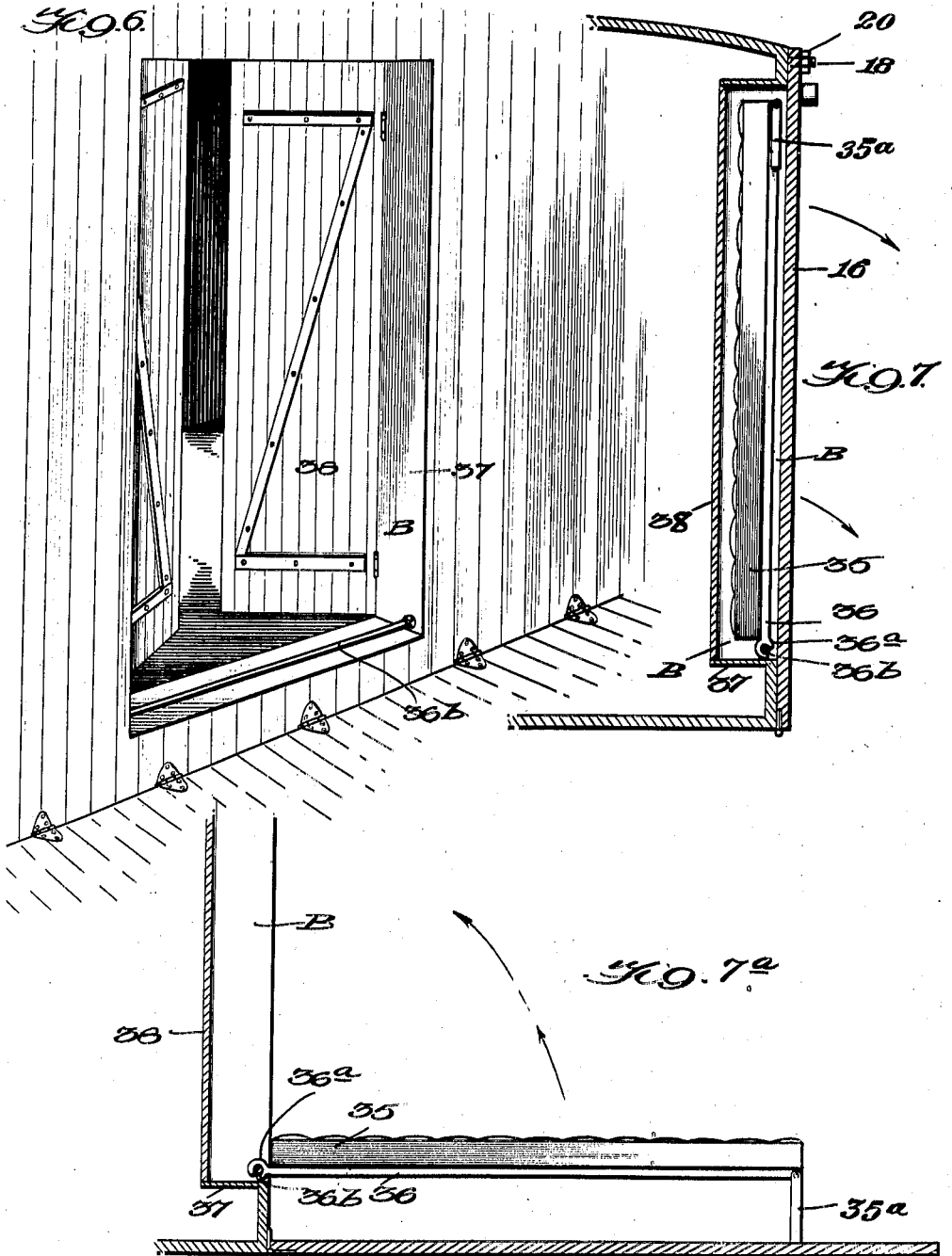

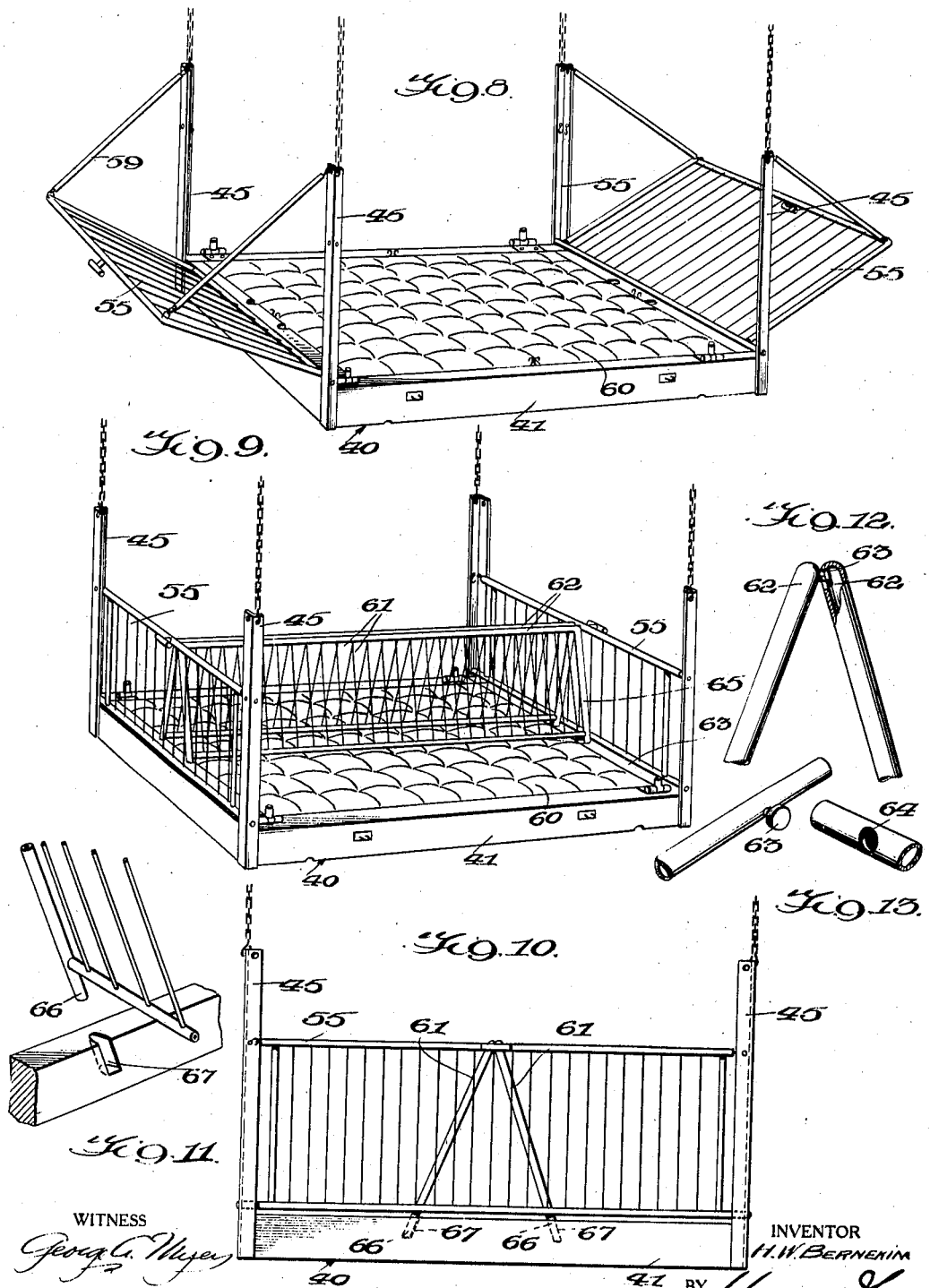

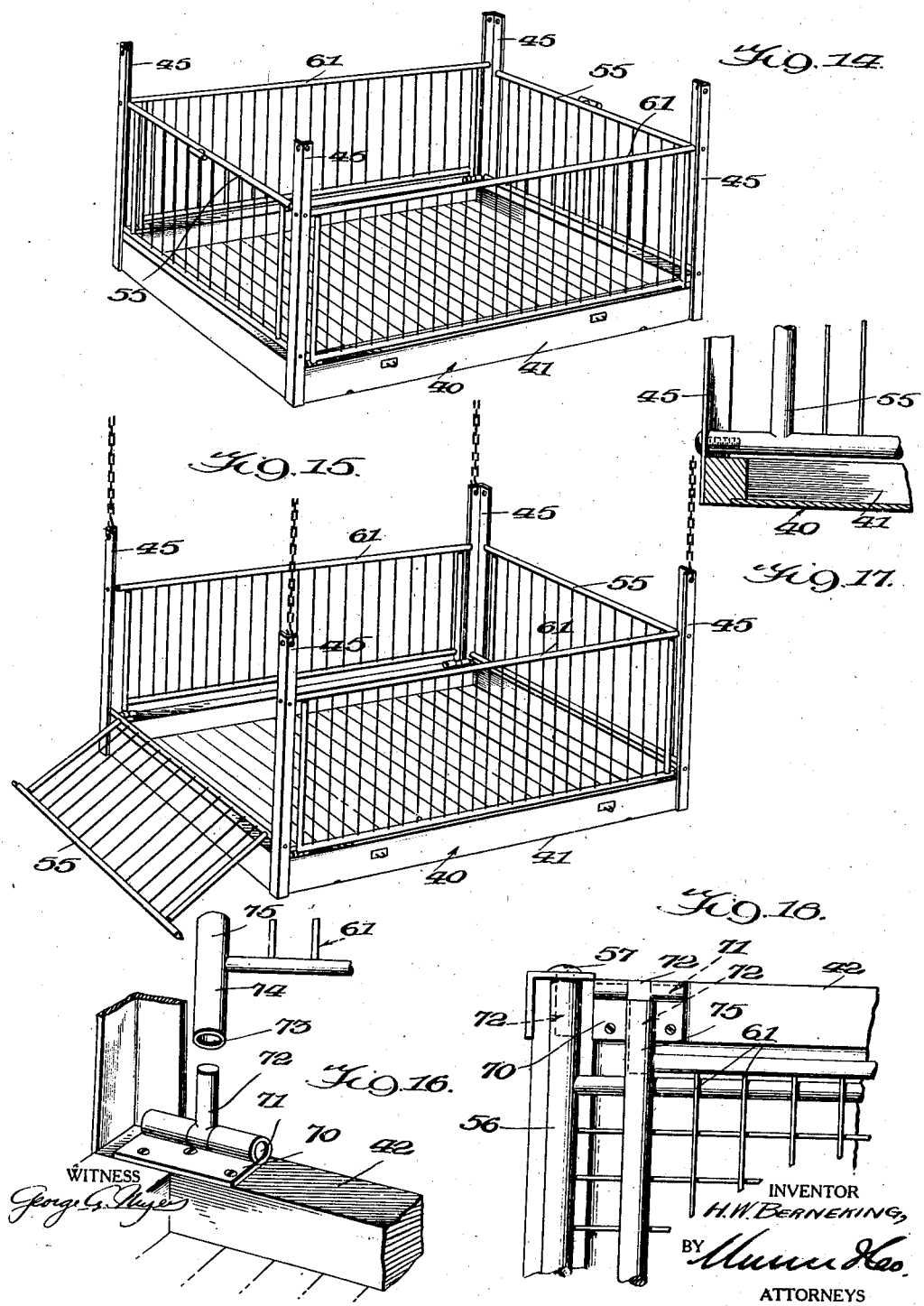

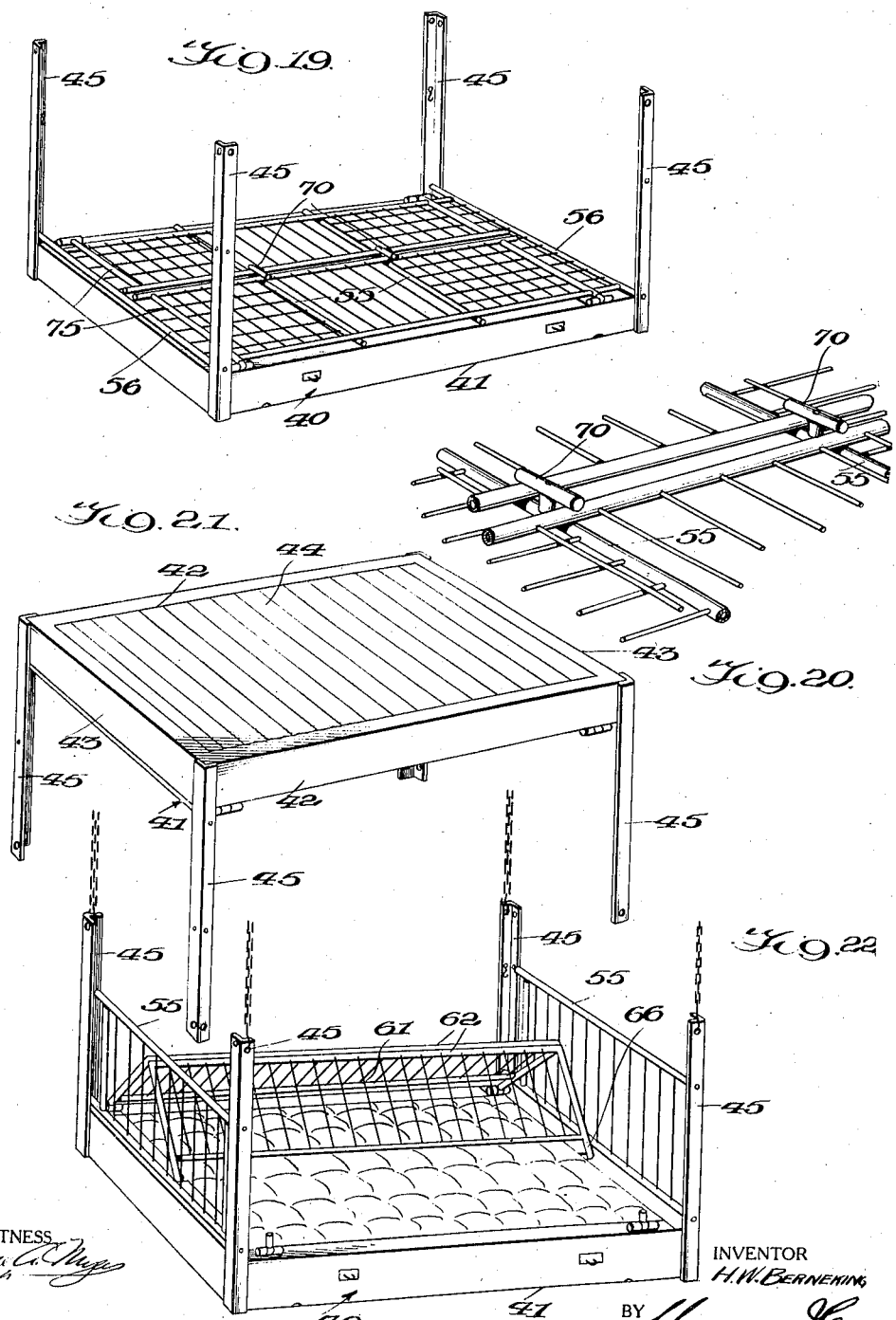

1,771,911

UNITED STATES PATENT OFFICE

HARRY W. BERNEKING, OF CYPRESS, ILLINOIS

TOURIST CAR

Application filed July 23, 1926. Serial No. 124,516.

This invention relates to an improvement in tourists' cars and aims to provide a car of this character which is well adapted for use for touring in that it provides indoor as well as outdoor sleeping quarters either of which may be used, depending upon the weather conditions or the taste of the user, as well as adequate means for the comfortable transportation of travelers and their luggage.

A further object resides in the provision of a car of this character and having these advantages and which has embodied therein an observation quarters in conjunction with a convertible article of furniture co-operable with the observation quarters to provide a convenient and comfortable means of repose for the person using the observation quarters as well as being adaptable for various other purposes.

A still further object resides in the provision of a touring car which when ready for traveling presents practically the same overall dimensions as an ordinary truck but which is so constructed and organized as to provide a relatively large amount of floor space when stopping for the night or for camping or for any purpose.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a perspective view showing the tourist car set up for camping.

Figure 2 is a fragmentary view illustrating the props used for holding up the hinged floor platforms, Figure 3 is a view partly in side elevation and partly in central longitudinal section showing the car when ready for travel, Figure 4 is a detail view in fragmentary section illustrating how the platforms at the side are folded up against the sides of the car to adapt the car for traveling, Figure 5 is a view in horizontal section on the line 5—5 of Figure 3, Figure 6 is a fragmentary perspective view showing the bed compartment and the inner swinging doors of the same, Figure 7 is a fragmentary view partly in section and partly in side elevation showing how the beds are supported when not in use, Figure 7ª is a view similar to Fig. 6 but showing the bed in use outside on the platform, Figure 8 is a perspective view showing the couch used in conjunction with the observation tower of the touring car, Figure 9 is a similar view showing the couch converted into a double settee, Figure 10 is a view in end elevation of the arrangement shown in Fig. 9, Figure 11 is a fragmentary perspective view showing how the sides are engaged with the end rails, Figure 12 is a fragmentary view partly in section and partly in elevation showing the means employed for releasably securing the top bars of the side members in Fig. 9.

Figure 13 is a fragmentary group view in perspective further illustrating the elements shown in Fig. 12, Figure 14 is a perspective view showing the couch and double settee converted into a baby yard, Figure 15 illustrates this article converted into a platform or bed for use in the observation tower, Figure 16 is a fragmentary perspective view showing the hinge employed at each end of each side member, Figure 17 is a fragmentary view in elevation showing the hinge employed at each end of each end member, Figure 18 is a fragmentary view in top plan showing how the hinges operate when the side and end members are folded over one on the other, Figure 19 is a perspective view showing the side and end members folded over and held in position, Figure 20 is an enlarged fragmentary perspective view illustrating the means for holding the side and end members folded, Figure 21 shows the article when in use as a table, Figure 22 shows the article converted into a portable swing, and Fig. 23 is a fragmentary detail perspective view showing one of the yieldable hangers.

Referring to the drawings the numeral 1 designates generally the chassis of a motor vehicle upon which the body, designated generally at 2, is mounted. The body 2 includes a floor 3, side walls 4, an end wall 5, a top 6 and a cap 7. In the top 6 an upper compartment or observation quarters, designated generally at 8, is embodied and includes upper and lower side guide rails 9, end frame members 10, vertical corner posts 11 and a top or roof 12. Sliding window sashes 13 are fitted in parallel grooves provided therefor in the guide rails 9 and swinging window sashes 14 are pivoted in the end frames. As shown in Fig. 3 of the drawings this compartment or observation quarters 8 has open communication with the main compartment of the car body.

On each side 4 of the body a canvas flap 15 is mounted and when the car is traveling this flap is confined between the wall 4 on which it is mounted and a plate-like platform 16 having its lower edge hinged, as at 17, to the lower edge of the wall 4. The plate-like platform 16 is held up against the flap 15 and the wall 4 by means of stud bolts 18 carried by the wall 4 and projecting through openings 19 formed in the plate-like platform 16. Nuts 20 are threaded on the bolts 18 as illustrated in Fig. 4 to complete the refastening of these parts. On the rear end wall 5 of the car a canvas flap 21 is fastened, the upper edge of the flap being suitably secured to the top of the rear end wall 5. This flap 21 is also connected to flaps 22 which may be folded over the flap 21 when the flaps are not in use. A plate-like platform 23 conforming to the shape of the rear end wall 5 has its lower end hinged, as at 26, to the lower edge of the end wall 5. Corner platforms 27 are hinged, as at 28, to the platform 23 and may be folded over on the platform 23 and then swung with the platform 23 up against the canvas flaps 21 and 22, as illustrated in Fig. 3. Stud bolts 29 project through suitable openings in the platforms 23 and 27 and coact with nuts 30 to hold the platforms and canvas flaps in the position shown in Fig. 3.

When camping for the night the platforms 16, 23 and 27 are extended, as shown in Fig. 1 and are held in horizontal position by means of suitable props 31. The canvas flaps 15, 21, and 22 are supported in extended position by virtue of their connection to the body 2 and by means of posts 32 and rods 33 inserted in hems provided therefor in the canvas flaps. Snap fasteners 34 may be employed to secure the corner flaps 22 to the flaps 15 and 21. Curtains, designated at C and held in position by snap fasteners S may also be employed when desired.

A number of beds, such as designated at 35, in Fig. 7 and 7ª, are provided and may be used either within the main compartment of the car or used on the platforms 16. The beds 35 consist of a suitable spring and frame 36 having hooks 36ª connected with one of its end bars and engageable with a rod 36ᵇ mounted on the car body within a bed compartment B. Foldable legs 35ª are provided to complete the support of the bed. When not in use the legs 35ª may be folded up against the underside of the spring and the spring swung into a vertical position in its compartment.

The bed compartment B is defined by walls 37 built in a side wall of the car body and is closed to the interior of the car body by swinging doors 38. When the bed is not in use the outside of the compartment is closed by the platform 16. Should it be desirable to sleep inside, the doors 38 are opened and the bed placed within the car. In changing the position of the bed its hooks 36ª are first disengaged from the rod 36ᵇ, the bed positioned as desired and then the hooks again engaged with the rod. Of course, in inclement weather it is particularly desirable to have a bed arrangement permitting the placing of the beds inside.

In conjunction with the observation quarters a combination floor for the quarters and convertible article of furniture, designated generally at 40, is provided and consists of a rectangular frame 41 made up of side bars 42 and rear bars 43. A plate 44 is connected with the side and end bars 42 and 43 and is adapted to provide a bottom for the frame at all times except when the article is used as a table when it provides a table top. Angle bars 45 are connected with the corners of the frame 41. Chains 46 are provided and have their lower ends connected by snap hooks 47 to the upper ends of the angle bars 45. The chains are extended through pulleys 47′ and are then passed down through guide latches 48 in the side bars 42 of the frame 41, under the frame 41 to the opposite side where they are connected with rings 49. The pulleys 47 are supported on supporting springs 50 suspended from the hanger brackets 51, the hanger brackets 51 being secured to the structure of the upper compartment or observation quarters 8. With this arrangement the device 40 is resiliently supported and when it is elevated its angle bars 45 engage the walls of the top compartment or observation quarters to hold the platform 40 against swinging. The platform 40 may be lowered down into the main compartment of the car, the snap hooks being engaged with links of the chains 46 and straps being provided between the rings 49 and the sides of the car to hold the platform against swinging. The platform 40 may be used as a couch, as illustrated in Fig. 8, wherein it will be seen that end members 55 are pivotally connected to the bars 45, as shown in detail in Figs. 17 and 18, the end members having bars 56, the ends of which are connected to pivot pins 57 mounted on the angle bars. Straps 59 are provided between the members 55 and the angle channel bars 45 to hold the end members 55 inclined. When the platform 41 is raised up into the observation quarters one of the end members 55 is taken off and the other is extended in the usual way, as shown in Fig. 8. Of course, suitable cushions, pillows, or mattress sections are provided for the end members 55 and a spring mattress 60 is received in the frame of the platform.

The arrangement shown in Fig. 8 may be readily converted into a double settee by raising the end member 55 into a vertical plane, as shown in Fig. 9 and securing their upper bars by hooks or other suitable means to the angle bars 45. The side members employed in conjunction with the arrangement are designated at 61, and when a double settee is provided these side members are positioned as shown in Fig. 9 and have their top bars 62 engaging each other and releasably held together by means of headed studs 63 and sockets 64. The side or end bars 65 of the frame members have lower extensions 66 designed to be fitted in slots 67 provided in the end bars 43 of the platform. With the parts so disposed the side members constitute the backs of the double settee and are inclined at such an angle as to insure comfort to the users of the settee. The convertible article of furniture may also be used as a baby yard by leaving the end members 55 in the vertical position and by hinging the side members 61 at their lower ends to the side bars 42 and by securing the upper ends of these side members to the angle bars so as to retain them in vertical position. For the purpose of hinging the side bars a hinged plate 70 is fastened to the side bars 42 and has a hinged pin 71 rotatably fitted therein and carrying a stud 72 adapted to be fitted in a socket 73 provided in an extension 74 of the end bar 75 of each side member 61. If desirable the article may be used as shown in Fig. 15 in conjunction with the observation platform, one end member being swung down to permit of ready passage into and out of the platform.

The article may also be employed as a lawn swing by simply disconnecting the side members from the channel bars, disengaging one side members from its hinges, engaging the top bars of the side members by means of the headed studs and sockets and positioning the side members as shown in Figure 2 wherein the extensions 66 of one side member are fitted in the keeper slots 67.

When it is desirable to employ the device as a table the side and end members are folded down one on the other as shown in Fig. 19 and these members are held in folded position by means of T-shaped holding bolts 70 pivoted to the top bars 55 of the end members and engageable with the top bars of the side members, as shown in Fig. 20. This holds the mattress in place and when the device is turned upside down an ordinary table construction is presented, as shown in Fig. 21.

By placing a mattress or mattress and spring in the baby play yard arrangement shown in Fig. 14 the article may be converted into a baby crib.

The walls 2 of the car body have sliding doors 100 therein opposite the rear wheels and the platforms 16 have hinged doors 101 opposite the doors 100. The doors 101 are held in closed position by means of suitable readily releasable latches. These doors 100 and 101 may be opened to facilitate changing of the rear tires or the removal of the rear wheel.

I claim:

1. In a touring car, a body having a bed compartment in one of its side walls, swinging doors closing the inner side of the bed compartment, a sill for said doors, a platform closing the outer side of the compartment and hinged to the side wall in a plane below the door sill, and adapted to be extended to provide a bed support, a bed, and means for swingably and detachably mounting the bed at one end in the bed compartment to permit it to be extended over the platform when the platform is disposed horizontally or to be reversed and extended into the interior of the car when the doors are opened.

2. In a touring car, a body having a bed compartment in one of its side walls, swinging doors closing the inner side of said compartment, a platform hinged to the outside of said car body and closing the outer side of the bed compartment and adapted when extended to provide a bed support, a rod mounted transversely in said compartment, a bed having means for swingably and detachably engaging said rod to permit it to be swung out over the platform when the latter is in horizontal position, or to be reversed and swung into the interior of the car when the doors are open adapting it for use in either inside or outside sleeping.

HARRY W. BERNEKING.